P. P. JENNEY.
Improvement in Rope Clamps.

No. 125,396.    Patented April 9, 1872.

Witnesses:
Eugene B. Frew
Joseph Smith

Inventor:
Perry P. Jenney
by A. B. Howland
Attorney

UNITED STATES PATENT OFFICE.

PERRY P. JENNEY, OF NEW BEDFORD, MASSACHUSETTS.

IMPROVEMENT IN ROPE-CLAMPS.

Specification forming part of Letters Patent No. 125,396, dated April 9, 1872.

Specification describing certain Improvements in Rope-Clamps, invented by PERRY P. JENNEY, of New Bedford, in the county of Bristol and State of Massachusetts.

My invention relates to the metal clamps used for grasping the rope or cable used in drilling Artesian wells, or for securing and setting up ropes and stays on shipboard or elsewhere. My improvements consist of a novel mode of hinging and locking the two semi-cylindrical shells forming the clamp, by means of which the hinge and lock or clasp can be lengthened or shortened at pleasure to fit any ordinary-sized rope; also in the peculiar formation of the inner surface of the clamp to prevent its slipping upon the rope; in the formation of the upper end of the clamp, and the attachment of the eyes or handles for suspending the same.

Figure 3:
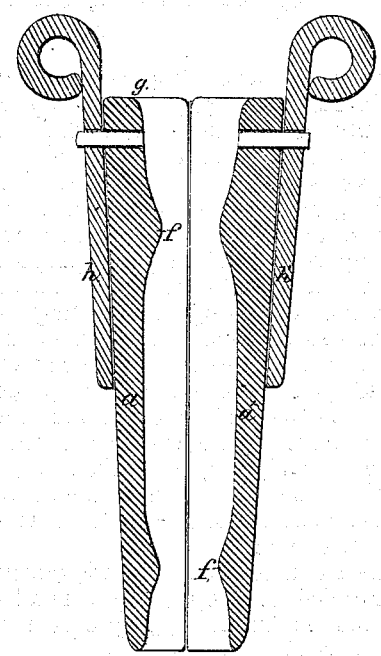
Figure 1:
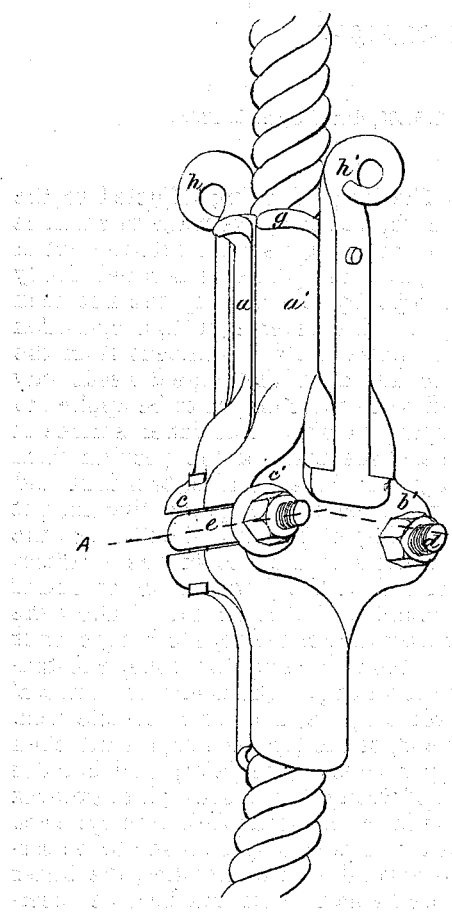
Figure 2:
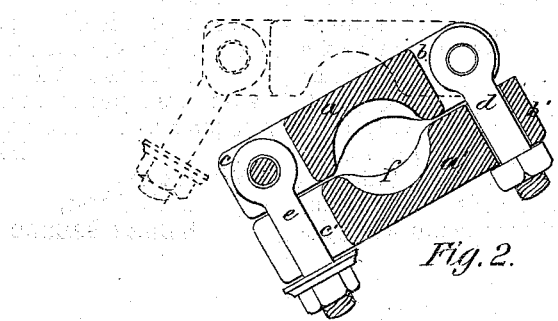

Figure 1 is a perspective view, showing the clamp applied to a rope; Fig. 2 is a horizontal section on line A B; Fig. 3 is a vertical section thereof.

$a\ a'$ are two semi-cylindrical shells or jaws, forming the clamp, provided with projections or lugs $b\ b'\ c\ c'$, to which the hinge $d$ and lock or clasp $e$ are attached. The hinge $d$ consists of a bolt pivoted at one end to the lug $b$, and passing through a hole in the lug $b'$, and provided with a thread or nut upon its outer end, by means of which the hinge may be adjusted and the jaws $a\ a'$ separated to fit any required size of rope. Upon the opposite side of the jaws the clasp $e$—which may be a bolt similar to the hinge-bolt—is pivoted to the lug $c$, and, when closed, swings into a slot in the lug $c'$, its nut holding it in place and allowing of its adjustment to correspond in length with the length of hinge-bolt and size of rope. A cam-lever may be substituted for the nut when desirable. The hinge $d$ being adjusted to the proper length, and the jaws made to embrace the rope, the clasp $e$ is slipped into the slot in the lug $c'$, and the whole is secured firmly upon the rope by screwing up the nut upon the clasp $e$. The reverse of this operation opens and allows of its detachment from the rope. The nut upon the hinge $d$ needs only to be used when the clamp is to be applied to ropes varying in size. The inner surface of the jaws $a\ a'$ are made of the peculiar form shown at $f\ f$, in Figs. 2 and 3, to indent and prevent the rope from slipping therein, but without cutting or injuring the fibers of the rope, and without the use of the wrapper. The upper end of the jaws $a\ a'$, or of one of them, is rounded of such form as to allow the upper or loose end of the rope to hang over or upon it without chafing the rope, substantially as shown at $g$. The shells or jaws $a\ a'$ would ordinarily be made of malleable iron. Handles $h\ h'$, of the form shown, are attached to the upper ends of the jaws; said handles are made of wrought-iron, fitting into grooves cast in the jaws, and secured thereto by rivets. Thus one set of jaws may be made to do service with several sets of handles, the latter being more liable to wear and become unserviceable than the former. The dotted lines show the clasp and jaws thrown open.

I claim—

As an article of manufacture, a rope-clamp, with jaws $a\ a'$, connected by means of the adjustable hinge-bolt $d$ and clasp or lock $e$, and having its inner surfaces formed as shown at $f\ f$, constructed substantially as described.

PERRY P. JENNEY.

Witnesses:
C. L. POOR,
HENRY SPENCE.